May 15, 1928.
C. LE G. FORTESCUE
1,669,609
REGULATOR SYSTEM
Filed March 18, 1925
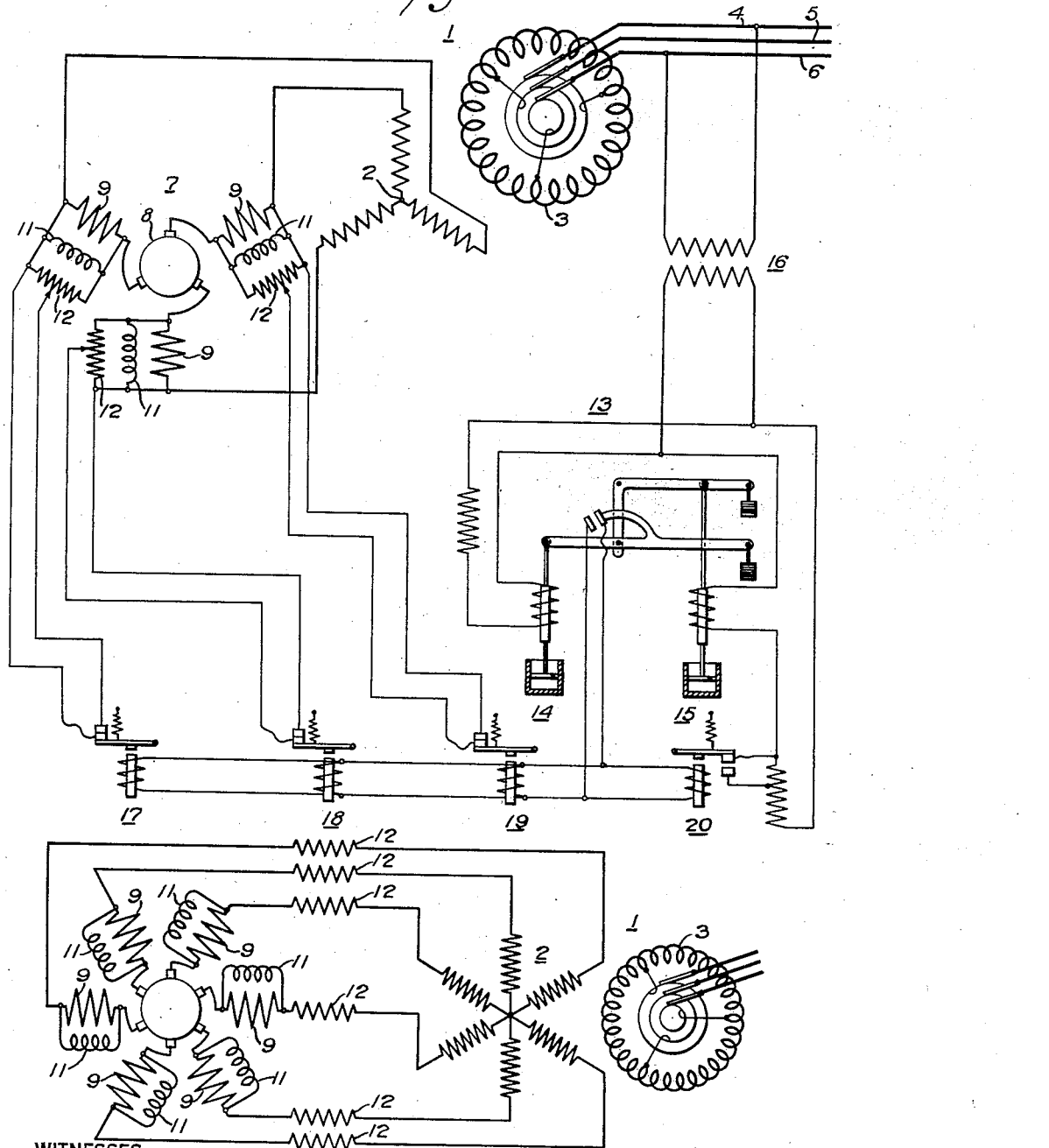
WITNESSES:
INVENTOR
Charles Le G. Fortescue
BY
ATTORNEY Patented May 15, 1928.

1,669,609

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed March 18, 1925. Serial No. 16,390.

My invention relates to regulator systems and it has special reference to systems for regulating the excitation current of dynamo-electric machines.

One object of my invention is to provide a system of the above-indicated character that shall be responsive to current changes that are initiated in the field-magnet winding of the dynamo-electric machine by variations in the load current that is being supplied by the armature thereof.

Another object of my invention is to provide a system of the above-indicated character that shall comprise means for varying the angle of field excitation with a change in load upon a generator, thus minimizing the decoupling effect between the armature and field flux.

A further object of my invention is to provide a system of the above-indicated character that shall comprise a polyphase series exciter generator and means for controlling the operation of the exciter generator.

In a generator of either the direct-current or the alternating-current type, there is an inherent tendency for the electromotive force to fluctuate with fluctuating loads upon the generator. This fluctuation is more marked if the armature reactance is low. The field-magnet windings of the generator will, therefore, receive current impulses by reason of armature reaction whenever there is a load change upon the machine and these impulses will tend to vary the excitation thereof.

The present invention contemplates using a polyphase series exciter, having a distributed series field winding connected in series-circuit relation with polyphase distributed field windings of an alternating-current generator.

A regulator is provided that is responsive to variations in voltage, or of any other electrical quantity of the load circuit, and this regulator is adapted to maintain the resistance value of the exciting circuit within predeterminel limits to maintain a proper voltage upon the load circuit.

In the accompanying drawing,

Figure 1 is a diagrammatic view of circuits and apparatus embodying my invention, using a three-phase exciter generator; and Fig. 2 illustrates the field-circuit connections using a six-phase exciter generator.

Referring to Fig. 1 of the drawing, an alternator 1 comprises a three-phase distributed field winding 2 and an armature winding 3 that is connected to supply power to the supply or line conductors 4, 5 and 6. A three-phase series exciter generator 7 has an armature winding 8 that is connected to the three-phase field winding 2 of the generator. A plurality of field windings 9 are also connected in series-circuit relation with the several phase windings of the exciter armature 8. A plurality of impedance coils 11 are provided, one being connected in parallel-circuit relation to each of the several field windings 9, and a plurality of variable resistors 12 are also connected in parallel-circuit relation to the field windings 9. A voltage regulator 13, which may be of the well-known Tirrill type, is provided, the main and anti-hunting magnets 14 and 15 of which are connected by means of a transformer 16 to the supply circuit 4—5—6. The main regulator contact members are operated in a well-known manner to actuate the normally closed relays 17, 18, and 19, and to thus control the effective value of the several resistors 12.

If an increase in load occurs upon the alterator 1, there will be an increase in the load current of the armature 3. This increase in armature current will vary the flux cutting the field-winding circuit, as a result of the effect of armature reaction and self-induction, and thereby vary the current flowing in the field winding. That is to say, a changed induced voltage in the field winding, caused by a changed armature flux, varies the impedance of the field winding, thus giving a changed field current with the same impressed field voltage. With a series-connected exciter in series relation with the field-magnet windings, such a variation in the alternator field current will result in a variation of the current flowing through the field windings 9 of the exciter generator 7. The variation in the strength of the current flowing through the field windings 9 will cause a variation in the electromotive force generated by the exciter generator 7, and this variation in electromotive force will be impressed upon the field windings 2 and result in a variation of the exciting current therein that is directly proportional to the initial current change caused by the changing load upon the alternator. The illustrated regulator operates to vary the effective value of the resistors 12, thus varying the negative impedance of the generator excitation circuit so as to maintain a constant generator voltage.

It has been found that a series generator may be designed to have, at a given speed, the characteristic of generating electromotive force substantially proportional to the generator current over a wide range of current values. The field-magnet winding circuit of the machine to be controlled has a varying impedance that is determined by several factors, among them being the changes in field current caused by armature reaction. The flux between the field core and the armature is determined partly by armature reaction and varies with variations in load upon the alternator. Assuming that there is an increase in load upon the alternator, such an increase in load will cause a variation in the strength of the field current substantially proportional to the load change, as explained above. This variation of field current varies the impedance of the field winding circuit substantially proportionally to the change in load. That is, it varies the voltage that it is necessary to apply to the terminals of the circuit in order to maintain a constant current therethrough.

Normally, the series exciter will generate an electromotive force substantially proportional to the impedance of the field-winding circuit. An increase in current in the alternator field winding will increase the field strength of the series exciter to generate an electromotive force opposed to the variation of the impedance of the excitation circuit. The exciter, therefore, operates as a negative impedance device and produces a voltage directly proportional to the current and having a definite phase angle with respect to the current changes in the circuit to which the negative impedance device is connected.

Inasmuch as the generator is excited by a plurality of distributed field windings that are in series relation with the several phases of the polyphase exciter generator, the angular position of the field flux is variable and is dependent upon the armature flux. The currents flowing through the several phases will not necessarily be equal, and, as the direction, or angle, of field flux varies, the value of the currents in the several phases will vary with respect to each other. The particular angle of field flux is determined by the relative current values in the several phases of the excitation circuit, and these values will depend upon the direction of flux in the generator armature. As the load upon the generator varies, the angle of armature reaction also varies, by reason of the de-magnetizing effect of armature flux upon the generator field thereby varying the angle of armature magnetization. Thus, the decoupling effect of armature and field flux is reduced to a minimum, and the armature and field fluxes are maintained substantially in phase with each other.

As the exciter voltage tends to rise or fall, the impedance coil 11 tends to absorb an amount of energy proportional to that absorbed by the field winding 9 to which it is connected in parallel relation and, therefore, prevent an undue fluctuation of the current in the excitation circuit. The resistive and reactive components of the impedance coils 11 and the resistors 12 should, therefore, be proportional to the resistive and reactive components of the field windings 9 with which they are associated. The current in a circuit comprising impedance coil 11 and resistor 12 of Fig. 1 will, therefore, have the same time phase lag as the current in the corresponding field-winding 9, and the current through each of the field windings 9 will, therefore, be a fixed proportion of the current in the corresponding phase of the machine. That is, the circuit connected in parallel relation to each field winding 9 should have the same time constant as that field winding.

The regulator 13 is provided for maintaining the resistance or impedance value of the excitation circuit within predetermined limits. The regulator comprises the resistors 12, which are connected in parallel-circuit relation to the field winding 9 of the series exciter and also in parallel relation to the impedance coils 11. The resistors 12 are a part of the excitation circuit and may be considered as a part of the impedance thereof. The resistor is adapted to have an effective value sufficient to maintain the proper circuit characteristic to maintain the excitation circuit of the generator 1 substantially constant.

If we suppose that the normal frequency of revolution of the generator corresponds to the frequency of the line to which the generator is supplying power, then the current flowing from the exciter generator would be a continuous current. The generated frequency delivered by the alternator would, however, not vary upon slowing down of the alternator by reason of an increase in load thereon, since the field of the alternator is not fixed but will shift with a shifting angle of armature flux. If, as assumed, the synchronous speed of the alternator requires continuous current excitation, a variation from the synchronous speed of the alternator will cause a current of slip frequency to flow through the excitation circuit.

Fig. 2 illustrates the excitation circuit using a six-phase series exciter generator connected to a six-phase distributed field winding of the alternator. A multiple-phase excitation circuit is necessary in order that the field flux may automatically change its direction, as required. Any convenient number of phases may be used.

The resistors 12 may be connected in series relation with the field windings 9 and the corresponding impedance coils 11 as illustrated in Fig. 2 of the drawing. In this case, each impedance coil 11 should have the same time constant as its associated field winding. The effective value of the resistors 12 is controlled by the voltage regulator to vary the impedance of the excitation circuit regardless of weather the resistor is connected in series or parallel circuit relation to the field winding 9.

Many modifications in the system and in the arrangement and location of parts may be made within the spirit and scope of my invention and I do not wish to be limited other than by the scope of the appended claims.

I claim as my invention:

1. The combination with a dynamo-electric machine comprising a field-magnet winding and an armature winding adapted to supply to a load, of an exciter connected to said field-magnet winding provided with an armature winding and a field winding connected in series-circuit relation, and an impedance device connected in parallel-circuit relation to said exciter field winding for influencing the current flow through said field winding.

2. The combination with a dynamo-electric machine comprising a field-magnet winding and an armature winding adapted to supply current to a load, of an exciter connected to said field-magnet winding provided with an armature winding and a field winding connected in series-circuit relation, and a resistor and an impedance device connected in parallel-circuit relation to said exciter field winding for influencing the current flow through said field winding.

3. The combination with a dynamo-electric machine comprising a field-magnet winding and an armature winding adapted to supply current to a load, of an exciter connected to said field-magnet winding provided with an armature winding and a field winding connected in series-circuit relation, an impedance device connected in parallel-circuit relation to said exciter field winding, and a resistor connected in parallel-circuit relation to said impedance device.

4. The combination with a dynamo-electric machine comprising a field-magnet winding and an armature winding adapted to supply current to a load, of an exciter connected to said field-magnet winding provided with an armature winding and a field winding connected in series-circuit relation, a resistor and an impedance device connected in parallel-circuit relation to said exciter field winding, and a regulator, actuated in accordance with the voltage of said dynamo-electric machine, for governing the effective value of said resistor.

5. The combination with a dynamo-electric machine comprising a field-magnet winding and an armature winding adapted to supply current to a load, of a polyphase exciter connected to said field-magnet winding and having an armature winding and a field winding connected in series-circuit relation, and an impedance device connected in parallel-circuit relation with said exciter field winding for influencing the current flow through said field winding.

6. The combination with a dynamo-electric machine comprising a field-magnet winding and an armature winding adapted to supply current to a load, of a polyphase exciter connected to said field-magnet winding and having an armature winding and a field winding connected in series-circuit relation, and a resistor and an impedance device connected in parallel-circuit relation to said exciter field winding for influencing the current flow through said field winding.

7. The combination with a dynamo-electric machine comprising a field-magnet winding and an armature winding adapted to supply current to a load, of a polyphase exciter connected to said field-magnet winding and having an armature winding and a field winding connected in series-circuit relation, an impedance device connected in parallel-circuit relation to said exciter field winding, and a resistor connected in parallel-circuit relation to said impedance device.

8. The combination with a dynamo-electric machine comprising a field-magnet winding and an armature winding adapted to supply current to a load, of a polyphase exciter connected to said field-magnet winding and having an armature winding and a field winding connected in series-circuit relation, a resistor and an impedance device connected in parallel-circuit relation to said exciter field winding, and a regulator, actuated in accordance with the voltage of said dynamo-electric machine for governing the effective value of said resistor.

9. The combination with an electric generator comprising a field-magnet winding and an armature winding for supplying current to a load, of a polyphase exciter connected in series-circuit relation with said field winding for supplying current thereto, said exciter being responsive to induced currents caused by variations in load upon the generator to maintain a predetermined excitation of said generator.

10. The combination with an electric generator comprising a field-magnet winding and an armature for supplying current to a load, of a polyphase series exciter connected to said field-magnet winding for supplying current thereto, said exciter being responsive to induced currents caused by variations in load upon the generator to maintain a substantially constant excitation of said generator irrespective of the load thereon.

11. The combination with an electric generator comprising a field-magnet winding and an armature, of an excitation circuit for said generator including said field-magnet winding and a polyphase series exciter, said exciter being adapted to generate a voltage substantially proportional to the impedance of the excitation circuit, and means for maintaining the impedance of the excitation circuit within predetermined limits.

12. The combination with an electric generator comprising a distributed field-magnet winding and an armature, of an excitation circuit for said generator including said field-magnet winding and a polyphase negative impedance means connected therewith, and regulating means for maintaining a predetermined characteristic of said excitation circuit.

13. The combination with a power circuit and a dynamo-electric machine comprising an armature winding connected to said power circuit and a polyphase field winding, of a polyphase exciter generator connected to said field winding and provided with a plurality of field windings for the several phases, a plurality of impedance devices connected in parallel-circuit relation to said several field windings, and means for varying the field currents of said exciter in accordance with an electrical quantity of said power circuit.

14. The combination with a dynamo-electric machine provided with a polyphase field winding, of a polyphase exciter generator connected thereto, said exciter generator having field windings in the several phases thereof, impedance devices connected in parallel-circuit relation to said field windings, and means for varying the excitation of said exciter generator in accordance with an electrical characteristic of said dynamo-electric machine.

In testimony whereof, I have hereunto subscribed my name this 9th day of March, 1925.

CHARLES LE G. FORTESCUE.